Patented Apr. 22, 1924.

1,491,653

UNITED STATES PATENT OFFICE.

EDGAR ARTHUR ASHCROFT, OF LONDON, ENGLAND.

TREATMENT OF SULPHIDE ORES AND EQUIVALENT METAL-BEARING MATERIALS FOR THE RECOVERY OF USEFUL PRODUCTS THEREFROM.

No Drawing.    Application filed April 16, 1923.  Serial No. 632,537.

*To all whom it may concern:*

Be it known that I, EDGAR ARTHUR ASHCROFT, a subject of the King of Great Britain, residing at 32a Liverpool Street, in the city of London, England, and of "Waye," near Ashburton, in the county of Devon, England, have invented new and useful improvements in the treatment of sulphide ores and equivalent metal-bearing materials for the recovery of useful products therefrom, of which the following is a specification.

This invention relates to improvements in the treatment of sulphide ores and equivalent metal-bearing materials for the recovery of useful products therefrom and comprises more particularly a selective chlorinating treatment of lead-zinc sulphide ores concentrates mattes and analogous materials (hereinafter termed lead-zinc sulphide ores and the like) containing sulphides of lead and zinc with or without relatively small proportions of other metallic constituents.

It is known that when lead-zinc sulphide ores and the like are subjected to the action of vapourized chloride of sulphur at relatively high temperatures (e. g. 600°–700° C.) the metallic sulphides are decomposed with liberation of sulphur and formation of metallic chlorides.

The present invention is based upon the observation that lead sulphide and silver sulphide are more readily attacked by chloride of sulphur than is zinc sulphide and that the other sulphides including those of copper and iron are intermediate in this respect; and further that the attack on lead sulphide proceeds almost to completion at a temperature as low as 100° C., whilst zinc sulphide is apparently scarcely if at all changed under these conditions. Antimony arsenic and tin sulphides are all readily attacked by chloride of sulphur and removal of these metals when present in the raw material treated is therefore facilitated. It is thus possible by operating under suitable temperature conditions to chlorinate the metallic sulphides selectively, so as to leave the major part of the zinc in a condition to be readily separated from the metallic chlorides formed. The chlorinated products are suitable for further treatment in various ways, such as those hereinafter referred to. Since the reaction of chloride of sulphur upon metallic sulphides is exothermic, a supply of heat from external sources can in most cases be largely dispensed with.

Although the chlorination of lead sulphide proceeds almost to completion at 100° C., the temperature may be allowed to rise to some extent above 100° C., without preventing the selective action. It is convenient to operate within the limits 100° to 150° C., but satisfactory results have been obtained at higher temperatures, for example 250° C. The upper limit of temperature compatible with a useful selective action depends to some extent upon the raw material used and the working conditions, but it is in any case much below 600° C.

Chlorides of sulphur of widely varying composition for use in carrying out the invention can be obtained by the direct action of chlorine upon sulphur. For example, chlorine may be passed into sulphur or into a strong solution of sulphur in sulphur monochloride maintained at 140° C., when a product containing approximately 40 per cent of sulphur and 60 per cent of chlorine distils off. Again, if the metallic chlorides obtained in practising the invention be electrolysed in the fused state at 420° C. and sulphur be introduced directly on to the surface thereof, a product containing approximately 60 per cent of sulphur and 40 per cent of chlorine distils off. Liquids of other composition may be obtained on suitably varying the temperature and other conditions. The boiling point of the product rises as the proportion of sulphur increases. All such chlorine-sulphur compounds and solutions are herein termed chloride of sulphur.

The invention consists in selectively chlorinating lead-zinc sulphide ores and the like by subjecting the ore or the like to the action of chloride of sulphur at a relatively low temperature, as hereinbefore explained. The product may be further treated in any desired manner for the recovery of useful compounds or metals therefrom, the following methods being specially suitable.

1. The hot residual chloride of sulphur, which carries in solution the sulphur liberated from the ore and from the reacting chloride of sulphur, is separated from the solid product containing the metallic chlorides and zinc compound. The mass is then treated with a hot aqueous solvent for lead chloride, for example water or a strong solution of zinc chloride, which dissolves the metallic chlorides (including any zinc chloride which may have been formed), leaving the zinc compound undissolved along with gangue or other residual matters. The hot solution is separated from the zinciferous residue and cooled in order to cause lead chloride to crystallize out, and from the lead chloride metallic lead may be obtained in any convenient manner, preferably by electrolysis of the fused salt. The zinciferous residue, either before or after concentration to eliminate the gangue, can be dealt with by known metallurgical methods—for example, chlorination in a converter, followed by electrolysis of the fused chloride. From the hot residual chloride of sulphur, if sufficiently saturated with sulphur, crystallized sulphur may be obtained by cooling, and in this manner sulphur can be recovered from the ore or the like.

2. Instead of a hot aqueous solvent for extracting the metallic chlorides, as in the preceding paragraph, fused zinc chloride (such as is used with or without admixture of alkali chloride in electrolytic cells as a medium for carrying lead chloride) may be employed—for example, by passing the fused salt through the solid product on a filter and washing the zinciferous residue with a little water to remove adhering zinc chloride, or by stirring the solid product with the fused salt, allowing settlement to take place, pouring off the clear melt and then washing the residue. The resulting melt and aqueous solutions may be treated in any desired manner, for example as described in the specification of my co-pending application for Letters Patent No. 1147 of 1923.

*Example.*

An ore mined by the Burma Corporation and having the following composition:—Pb, 24.4; Zn, 21.3; Fe, 3.8; S, 14.7; Cu, 0.6; Sb, 0.17; As, 0.07; Ag, 0.093; and gangue, 32.2 per cent, is subjected to selective chlorination.

One hundred litres of sulphur monochloride containing 52% S are placed in an iron mixing vessel and warmed to 50° C. About 100 kilos of the ore (crushed to 30-mesh, but not necessarily concentrated) are slowly fed in with continual stirring, the rate of addition being so regulated as to keep the temperature at approximately 100° C. The hot reaction mixture, which forms a slurry, is run on to a vacuum filter or pressure filter and the chloride of sulphur is thoroughly drained off. Preferably the mass is washed with a small quantity of hot, fresh sulphur monochloride. The chlorinated residue is treated with a hot aqueous solvent in order to extract and separate the soluble metal chlorides from the residual zinc compound, as hereinbefore described; crystallized lead chloride is obtained from the solvent on cooling, and silver is recovered by known methods.

What I claim is:—

1. In the treatment of lead-zinc sulphide ores, the step of subjecting the ore to the action of chloride of sulphur at a relatively low temperature.

2. In the treatment of lead-zinc sulphide ores, the step of subjecting the ore to the action of chloride of sulphur at a temperature at which only a portion of the metallic sulphides are decomposed and form metallic chlorides.

3. In the treatment of lead-zinc sulphide ores, the step of subjecting the ore to the action of chloride or sulphur at a temperature at which the lead sulphide is decomposed, but below a temperature at which a substantial portion of the zinc sulphide is decomposed.

4. In the treatment of lead-zinc sulphide ores, the step of subjecting the ore to the action of chloride of sulphur at a temperature of about 50° to 150° C.

5. In the treatment of sulphide ores, the steps of subjecting the same to the action of chloride of sulphur to convert certain of the sulphide constituents into metallic chlorides, and then separating the metallic chlorides from the residual unconverted sulphide or constituents.

6. In the treatment of sulphide ores, the steps of subjecting the same to the action of chloride of sulphur to convert certain of the sulphide constituents into metallic chlorides, removing the residual sulphur and chlorides of sulphur, and then separating the metallic chlorides from the residual unconverted sulphide or constituents.

7. In the treatment of sulphide ores, the steps of subjecting the same to the action of chloride of sulphur to convert certain of the sulphide constituents into metallic chlorides, and then separating the metallic chlorides from the residual unconverted sulphide or constituents by extraction with a hot aqueous solvent.

8. In the treatment of sulphide ores, the steps of subjecting the same to the action of chloride of sulphur to convert certain of the sulphide constituents into metallic chlorides, removing the residual sulphur and chlorides of sulphur, and then separating the metallic chlorides from the residual unconverted sulphide or constituents by extraction with a hot aqueous solvent.

9. In the treatment of sulphide ores, the steps of subjecting the same to the action of chloride of sulphur to convert certain of the sulphide constituents into metallic chlorides, removing the residual sulphur and chlorides or sulphur, and then separating the metallic chlorides from the residual unconverted sulphide or constituents, the separated residual sulphur and chlorides of sulphur being cooled and the crystallized sulphur recovered.

In testimony whereof I have signed my name to this specification in the presence of two subscribing witnesses.

EDGAR ARTHUR ASHCROFT.

Witnesses:
GILBERT FLETCHER TYRON,
LEONARD WALTER.